United States Patent [19]

Berke et al.

[11] Patent Number: 4,661,163

[45] Date of Patent: Apr. 28, 1987

[54] LUBRICANT FOR PROCESSING OF PLASTICS

[75] Inventors: Fritz Berke, Herne; Helmut Kehr, Schermbeck; Adolf Kühnle, Marl, all of Fed. Rep. of Germany

[73] Assignee: Huels Aktiengesellschaft, Marl, Fed. Rep. of Germany

[21] Appl. No.: 759,573

[22] Filed: Jul. 26, 1985

[30] Foreign Application Priority Data

Jul. 28, 1984 [DE] Fed. Rep. of Germany ....... 3427883

[51] Int. Cl.$^4$ .......................... B29C 1/04; C08J 5/18; C08L 27/06; C10M 7/26
[52] U.S. Cl. .................................. 106/270; 260/410; 524/275; 524/278
[58] Field of Search ....................... 106/270; 260/410; 524/275, 278

[56] References Cited

U.S. PATENT DOCUMENTS

| | | | |
|---|---|---|---|
| 3,243,310 | 3/1966 | Hull et al. | 106/270 |
| 3,300,321 | 1/1967 | von Rosenberg et al. | 106/270 |
| 4,129,536 | 12/1978 | Martin et al. | 524/278 |
| 4,192,930 | 3/1980 | Beck et al. | 524/315 |

FOREIGN PATENT DOCUMENTS

| | | | |
|---|---|---|---|
| 2394556 | 1/1979 | France. | |
| 54-118450 | 9/1979 | Japan | 524/275 |
| 1383262 | 2/1975 | United Kingdom. | |

*Primary Examiner*—Ronald W. Griffin
*Attorney, Agent, or Firm*—Millen & White

[57] ABSTRACT

An ester of an acidic oxidized polyethylene wax and, for example, a polyhydric alcohol of a chain length of 2-5 carbon atoms, wherein the acid number of the oxidized polyethylene wax is, prior to esterification, 10-35 and the acid number of the wax ester is 8 or less, is useful as a lubricant for plastics processing, especially for rolling and calendering unplasticized PVC into sheeting.

20 Claims, No Drawings

LUBRICANT FOR PROCESSING OF PLASTICS

CROSS-REFERENCE TO RELATED APPLICATION

This application is related to U.S. Ser. No. 759,571 filed on July 26, 1985 and which disclosure is incorporated by reference herein entirely.

BACKGROUND OF THE INVENTION

It is known to utilize lubricants in the processing of thermoplastic synthetic resins, inter alia, to lower the required processing temperature. In particular, lubricants have been proposed in the manufacture of rigid sheeting from PVC on heated rolls and calenders.

Among such lubricants, are polyethylene hard paraffins and the oxidized polyethylene waxes prepared therefrom by oxidation. The nonpolar, polyethylene hard paraffins are incompatible with PVC and therefore display a strong external lubricating effect. The oxidized polyethylene waxes which are more or less polar, depending on thier oxidation degree, are compatible with PVC to a certain extent. Consequently, such polyethylene waxes not only exhibit an external lubricating effect but also usually improve the flow characteristics of unplasticized-PVC melts.

Similar to the oxidized polyethylene waxes proper, also suitable as PVC lubricants are such waxes which have been esterified with a polyhydric alcohol, e.g. ethylene glycol. However, apart from a slightly higher light transmission, from which a somewhat better compatibility can be derived, such polyethylene waxes esterified with ethylene glycol differ only insubstantially in their behavior toward unplasticized PVC from non-esterified polyethylene waxes as described in DAS No. 2,201,862.

The comparative test summarized in Tables 1 and 2 confirms this fact. In this case, an oxidized polyethylene wax "A" is compared, in two different PVC test formulations, with the corresponding, glycol-esterified polyethylene wax "A Esterified". The technical properties of "A" and "A Esterified" correspond to the lubricants disclosed in DAS No. 2,201,862:

"A" with osmometric molecular weight of about 1,300, acid number of 63, saponification number of 112, dripping (liquefying) point of 106° C.

"A Esterified" with acid number of 32, saponification number of 109.

TABLE 1

Test Formulation:
100 parts by weight of bulk PVC (K value 58)
0.5 parts by weight of organotin compound (stabilizer)
1.0 part by weight of lubricant

|  | Max. Torque (Brabender Plastograph) | Plasticizing Period (Brabender Plastograph) | Light Transmission (2 mm Plates) |
|---|---|---|---|
| "A" | 24.6 Nm | 3.3 min | 68% |
| "A Esterified" | 24.1 Nm | 3.3 min | 74% |

TABLE 2

Test Formulation:
100 parts by weight of emulsion PVC (K value 80)
0.5 parts by weight of diphenyl thiourea (stabilizer)

TABLE 2-continued

Test Formulation:
4.0 parts by weight of lubricant

| | Force as Function of Number of Revolutions with Constant Nip Width (Measuring Rolling Mill) |
|---|---|
| "A" | 39 kN |
| "A Esterified" | 39 kN |

As a result there is no expectation of any advantages resulting from the esterification step.

SUMMARY OF THE INVENTION

It is an object of this invention to provide new lubricating agents for thermoplastic resins which have improved properties.

Upon further study of the specification and appended claims, further objects and advantages of this invention will become apparent to those skilled in the art.

These objects have been attained by providing lubricants for plastics processing which are esterification products of an oxidized polyethylene wax with a polyhydric alcohol having a chain length of 2-5 carbon atoms or with a mixture of a mono-alcohol (monohydric) having a chain length of 4-20 carbon atoms and a polyhydric alcohol having a chain length of 2-5 carbon atoms, wherein (a) prior to the esterification, the acid number of the oxidized polyethylene wax was 10-35 mg KOH/g, and (b) the acid number of the resultant wax ester is 8 mg KOH/g or less and, at the same time, the acid groups represented by the acid number (a) are esterified to an extent of at least 70% in the ester.

DETAILED DISCRIPTION

It has been found surprisingly that the lubricating properties of such an esterified oxidized polyethylene wax differ considerably from those of a non-esterified one and are superior thereto.

The requirements of this invention, inter alia, include the condition of a very extensive esterification. Although the aforementioned DAS No. 2,201,862 ostensibly mentions completely esterified polyethylene waxes, they, in fact, are not prepared. Rather, it can be derived from DAS No. 2,432,215 that, by following the teaching of the former reference, long reaction periods must be tolerated due to the reluctance of the oxidized polyethylene products to esterify using the particular reaction conditions of DAS No. 2,201,862 (sulfuric acid). It can be seen from the examples in DAS No. 2,201,862 that the claimed temperatures apparently cannot be employed either, due to discoloration effects. From all this, it can be concluded that entirely or higly esterified polyethylene waxes could not be and were not prepared using the methods of the prior art and thus were not tested in PVC, either.

The oxidized polyethylene waxes themselves required for the esterification are obtained by conventional oxidation of hard paraffins in the melt at temperatures of 120°-250° C., preferably 130°-180° C., using air. This oxidation turns out especially well in the presence of 0.01-3.9% by weight of a zinc salt, preferably a zinc soap, such as zinc stearate.

The acid number of the oxidized products is usually 10 to 35, preferably 15 to 30; the saponification numbers of such products usually are 15-70, preferably 25-60; and the dropping points are usually 90°-140° C. Partially saponified oxidation products can also be utilized with acid numbers of 10–20 and saponification numbers of 15–40. Partial saponification can be performed in a manner known per se by partial neutralization in the melt of the acid groups of the oxidized wax product, either continuously during oxidation or after completion of oxidation. Usually used are bases such as sodium hydroxide, potassium hydroxide, lithium hydroxide, calcium hydroxide or zinc hydroxide and/or mixtures of these bases.

Hard paraffins suitable for the oxidation are obtainable conventionally by ethylene polymerization by the Ziegler process, in a fashion controlled to produce such products or as hydrocarbon-soluble by-products. These hard paraffins usually have molecular weights of 1,000–4,000, preferably 1,000–3,000. Further details of suitable hard paraffins and/or oxidized products thereof are given in U.S. Ser. No. 759,571 filed July 26, 1985 and in F. Ullmann, Encyklopädie der technischen Chemie, Band 24 (1983) 1–49, Verlag Chemie Weinheim.

Polyhydric alcohols (e.g., aliphatic, hydrocarbon, saturated, branched or straight chained) of 2–5 carbon atoms suitable for the esterification include, for example, 1,2-ethanediol, 1,2-propanediol, 1,3-propanediol, 1,3-butanediol, 1,4-butanediol, glycerol or pentaerythritol. Also suitable are mixtures of a mono-alcohol (e.g., aliphatic, hydrocarbon, saturated) with a terminal-positioned OH-group, a chain length (branched or straight chain) of 4–20 carbon atoms (preferably 5–12 carbon atoms), and one of the aforementioned polyhydric alcohols, e.g., an n-amyl alcohol/1,2-ethanediol mixture. Suitable mono-alcohols include n-octylalcohol and n-nonylalcohol.

The alcohol is added in an amount from one-half to twice the stoichiometric amount based on the acid number of the paraffin, preferably in amounts of 0–50% above the stoichiometric amount with respect to this acid number. Optionally, excess alcohol is removed from the reaction mixture after esterification by the application of a vacuum.

In the esterification, catalysts are of help, particularly zinc salts such as zinc chloride, or zinc soaps, such as zinc stearate and/or those produced intermediarily by reacting wax acids with zinc hydroxide. Suitable proportions of zinc compounds, based on the reaction mixture, are 0.01–3.0% by weight. For details of an esterification which can be used to prepare the waxy esters, see, e.g., U.S. Ser. No. 759,571 filed July 26, 1986, which disclosure is incorporated by reference herein.

The resultant acid number of the wax ester is to be 8 or less, preferably about 0–6. At least 70%, preferably 75–100%, most preferably essentially 100%, of the wax acids covered by the acid number of the starting paraffin must be esterified in the wax ester product.

Herein, acid number is determined conventionally, e.g., according to DGF-Einheitsmethoden M-IV 2.

The waxy esters of this invention can be used as lubricants in the processing of thermoplastic resins, particularly PVC and other synthetic resins, e.g., polystyrene, polyethylene, polypropylene, polyurethane, polyphenylenoxide, copolymers of vinylchloride and vinyl acetate, of acrylic ester, butadiene and styrene etc., polycarbonate etc. They are particularly useful as lubricants in calendering and heater roller processing for making rigid foils and sheets. Details of their use are fully conventional; see, e.g., R. Gächter u. H. Müller, Taschenbuch der Kunststoff-Additive, 1979, Carl Hanser Verlag München Wien. which disclosure is incorporated by reference herein. For example, amounts of the lubricants of this invention are usually 0,5–5 wt% based on the amount of resin, preferably PVC.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The examples demonstrate the surprising properties of the wax esters according to this invention.

EXAMPLE 1

TABLE 3

| Test Formulation: |   |
| --- | --- |
| 100 parts by weight of emulsion PVC (K value 80) | |
| 0.5 part by weight of diphenyl thiourea (stabilizer) | |
| 4.0 parts by weight of lubricant | |
|  | Force as a Function of Number of Revolutions with Constant Nip Width (Measuring Rolling Mill) |
| Polyethylene wax "B" (osmometric molecular weight about 1,400, acid number 30, saponification number 53, dropping point 112° C.) | 37 kN |
| Polyethylene wax "B", esterified with butanediol (acid number 4, saponification number 50) | 28 kN |
| Polyethylene wax "C" (osmometric molecular weight about 1,300, acid number 25, saponification number 43, dropping point 107° C.) | 36 kN |
| Polyethylene wax "C", esterified with ethylene glycol (acid number 2, saponification number 41) | 26 kN |
| Polyethylene wax "C", partially esterified with ethylene glycol (acid number 14, saponification number 42) | 32 kN |
| Polyethylene wax "D" (osmometric molecular weight about 1,300, acid number 18, saponification number 32, dropping point 112° C.) | 34 kN |
| Polyethylene wax "D", esterified with ethylene glycol (acid number 5, saponification number 31) | 23 kN |

Specimen "C" demonstrates the great force required, i.e. poorer lubricating properties, if merely partial esterification is performed in accordance with the prior art, rather than practically completely in accordance with this invention.

EXAMPLE 2

TABLE 4

| Test Formulation: |   |
| --- | --- |
| 100 parts by weight of emulsion PVC (K value 80) | |
| 0.5 part by weight of diphenyl thiourea | |
| 4.0 parts by weight of lubricant | |
|  | Force as a Function of Number of Revolutions with Constant Nip Width (Measuring Rolling Mill) |
| Montanic acid ester (esterified | 28 kN |

TABLE 4-continued

| Test Formulation: | |
|---|---|
| with ethylene glycol, acid number 10-20, saponification number 155-175) | |
| Montanic acid ester (esterified with glycerol, acid number about 25, saponification number about 150) | 30 kN |
| Polyethylene wax "B", esterified with butanediol (acid number 7, saponification number about 50) | 28 kN |
| Polyethylene wax "C", esterified with ethylene glycol (acid number 2, saponification number 41) | 26 kN |
| Polyethylene wax "D", esterified with ethylene glycol (acid number 5, saponification number 31) | 23 kN |

In this case, the lubricating properties of the discovered polyethylene wax esters even surpass those of the montanic acid esters. This is manifested not only in a lower expenditure of force in measurements with the measuring rolling mill, but also in a higher thermostability in a long-term rolling test (180° C.). While unplasticized PVC mixtures, for example, stabilized with diphenyl thiourea and containing montanic acid ester showed a marked yellow coloring after 7-8 minutes, no substantial color changes were observed under identical conditions in corresponding unplasticized PVC mixtures containing the discovered polyethylene wax esters.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound which is the waxy esterification product of an acidic oxidized polyethylene wax and (a) a polyhydric alcohol of 2-5 carbon atoms or (b) a mixture of a mono-alcohol of 4-20 carbon atoms with a terminal OH group and a polyhydric alcohol of 2-5 carbon atoms, wherein (i) the acid number of the acidic oxidized polyethylene wax is 10-35 mg KOH/g before the esterification, (ii) the acid number of the waxy esterification product is 8 mg KOH/g or less, and (iii) the acid groups represented by the acid number of the starting material acidic oxidized polyethylene wax, are esterified to an extent of at least 70% in the waxy esterification product.

2. A compound of claim 1 wherein the acidic oxidized polyethylene wax was prepared from oxidation of a hard paraffin of a molecular weight of 1000-4000, in the melt.

3. A compound of claim 2 wherein said oxidation was carried out at 120°-250° C. in the presence of a catalytic amount of zinc.

4. A compound of claim 1 wherein the acid number of the starting material oxidized polyethylene wax was 15-30 and its saponification number was 15-70.

5. A compound of claim 4 wherein the ester is based on a polyhydric alcohol.

6. A compound of claim 1 wherein the ester is based on an polyhydric alcohol.

7. A compound of claim 6 wherein the alcohol is 1,2-ethanediol, 1,2-propanediol, 1,3-propanediol, 1,3-butanediol, 1,4-butanediol, glycerol or pentaerythritol.

8. A compound of claim 1 wherein the ester is based on said mixture of alcohols.

9. A compound of claim 8 wherein the polyhydric alcohol is 1,2-ethanediol, 1,2-propanediol, 1,3-propanediol, 1,3-butanediol, 1,4-butanediol, glycerol or pentaerythritol.

10. A compound of claim 1 wherein the amount of alcohol used to form the esterification product is 0.5 to 2 times the stoichiometric amount.

11. A compound of claim 10 wherein said amount is 1 to 1.5 times the stoichiometric amount.

12. A compound of claim 1 having an acid number of about 0 to 6.

13. A compound of claim 12 wherein the ester is based on a polyhydric alcohol.

14. In a composition comprising a synthetic thermoplastic resin and an effective amount of a lubricating agent, the improvement wherein the lubricating agent is a compound of claim 1.

15. A composition of claim 14 wherein the resin is PVC.

16. In a process of rolling or calendering a thermoplastic synthetic resin into sheet form comprising rolling or calendering a composition comprising the resin and a lubricant, the improvement wherein the composition is one of claim 15 and the PVC is unplasticized.

17. In a composition comprising a synthetic thermoplastic resin and an effective amount of a lubricating agent, the improvement wherein the lubricating agent is a compound of claim 4.

18. A composition of claim 17 wherein the resin is PVC.

19. In a composition comprising a synthetic thermoplastic resin and an effective amount of a lubricating agent, the improvement wherein the lubricating agent is a compound of claim 12.

20. In a process of rolling or calendering a thermoplastic synthetic resin into sheet form comprising rolling or calendering a composition comprising the resin and a lubricant, the improvement wherein the composition is one of claim 14.

* * * * *